Figure 1:
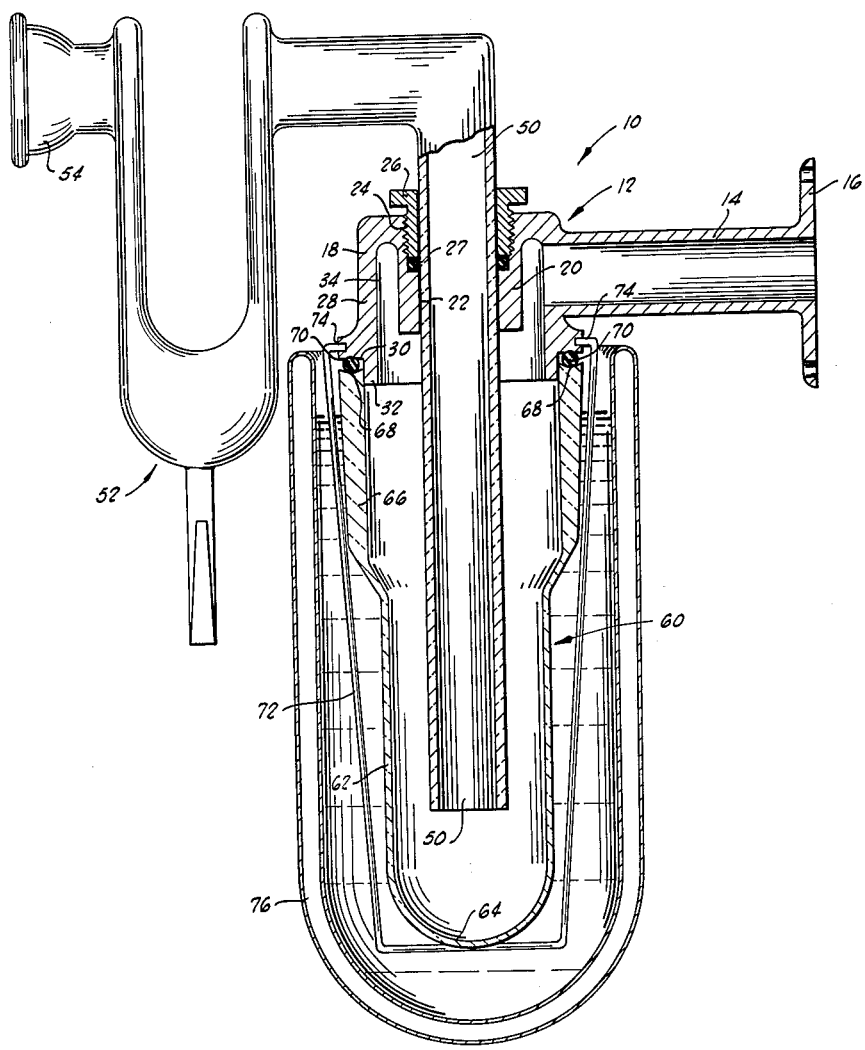

Nov. 9, 1965   E. W. BOYER ETAL   3,216,207
COLD TRAP ASSEMBLY FOR HIGH VACUUM SYSTEMS
Filed Oct. 15, 1962

INVENTORS
ERNEST W. BOYER &
CLARENCE C. SMITH
BY
ATTORNEY 3,216,207
COLD TRAP ASSEMBLY FOR HIGH VACUUM
SYSTEMS
Ernest W. Boyer and Clarence C. Smith, Ponca City, Okla., assignors to Continental Oil Company, Ponca City, Okla., a corporation of Delaware
Filed Oct. 15, 1962, Ser. No. 230,653
5 Claims. (Cl. 62—42)

The present invention relates to vapor condensers, and more particularly, but not by way of limitation, relates to improvements in cold traps for high vacuum laboratory distillation systems.

When conducting high vacuum distillation analysis in the laboratory, it is essential that a material balance be made after each distillation run in order to insure that no material has been lost or that no compound has been altered or added to. The material balance may be accomplished by comparing the weight of the initial charge placed in the distillation system with the total weight of all components resulting from the distillation run, such as the various condensate fractions collected, the residue left in the column, and any vapors condensed in cold traps and the like. Of course the initial and final weights should be equal within a certain permissible error limitation or the data obtained from the distillation run cannot be considered reliable.

Although laboratory vacuum distillation systems vary to a considerable extent, all distillation systems include a distillation column which is evacuated by a vacuum pump. During the course of a distillation run, condensate is taken primarily from the head of the column by any one of several suitable devices. However, some of the vapors will not be condensed by these devices and will pass through the vacuum line interconnecting the column and the vacuum pump. In order to prevent the loss of these vapors and to prevent corrosion damage to the vacuum pump it is customary to place various types of vapor traps in the vacuum line. One type of vapor trap which is used extensively is the so-called "cold finger trap" which consists primarily of a U-shaped conduit having a solid extension which can be inserted in a coolant for heat transfer purposes and some means for draining the condensed vapors. The cold finger trap is particularly useful during the period of time when the vacuum is being established on the column because the relatively large volume of vapors which are mixed with the air and which must be withdrawn from the column can be condensed in the cold finger trap and removed from the system. However, as the vacuum pressure is increased, the cold finger trap by its nature is incapable of maintaining the condensate at a sufficiently low temperature as to prevent at least part of the condensate from boiling at the low pressure. The vapors thus reproduced not only tend to pass through the vacuum pump and thereby upset the material balance, but also exert a pressure back against the distillation column which interferes with the distillation run. Therefore, a refrigerated cold trap is also usually provided between the cold finger trap and the vacuum pump for condensing the constituent vapors which must be retained for a proper material balance, and for maintaining the condensate in liquid form so that the pressure of the column can be maintained at a high vacuum. The gases having uncondensable components are then passed through the vacuum pump and expelled from the system.

There are several types of metallic cold traps presently available on the market which continually refrigerate the condensed vapors to maintain a liquid state. Due to the fact that most compounds are considerably more corrosive during the phase change from vapor to liquid, these metallic cold traps nearly always have condensing plates fabricated from some corrosion resistant metal such as silver or stainless steel. It is essential that corrosion be maintained at a very low level, not only to prevent damage to the cold trap, but also to prevent contamination of the condensate by the products of corrosion which would then upset the material balance of the distillation run. In spite of the exotic stable metals used for fabricating the various condensing plates, there are many compounds which are so corrosive during the phase change that the metallic cold traps are completely unsuitable. This is particularly true in cases where acylaldehyde is being condensed because even though this compound in liquid form can be stored in mild steel tanks, during the phase change the compound will quickly corrode through any but the more resistive metals.

In order to combat corrosion of the condensing plate in the cold trap and the resulting contamination of the condensate, cold traps fabricated entirely of glass have been devised and are commercially available. However, these traps are assembled by one or more tapered, ground and greased glass joints. Not only is there danger that the grease will contaminate the condensate, but due to the vacuum within the trap, the atmospheric pressure frequently presses the glass joint together with such force that all the lubricating grease is squeezed from the joint and ground glass then comes in contact with ground glass. In such a case, the joint frequently sticks or freezes and is virtually impossible to separate without breaking the glass joint and thereby destroying the trap. Further, when the glass joint is broken there is danger the the condensate within the trap will be further contaminated or a portion lost, and the material balance upset. In that event, the distillation run must be repeated, if sufficient material is available for another charge.

Another serious disadvantage of all known cold traps, whether fabricated from metal, glass or a combination of the two materials, is that the traps cannot be easily disassembled in order to remove the condensate and to clean the components of the trap in preparation for another distillation run. This is particularly true of the glass cold traps wherein the greased glass joints must be separated, the device cleaned, and the joints greased again before being rejoined. Then the rejoined members must be tested under vacuum, and as is well known by workers in the art, a vacuum-tight joint is sometimes difficult to obtain.

Still another situation sometimes encountered during the operation of a cold trap arises when a fairly large volume of condensate accumulates so as to form a liquid seal between the vacuum source and the vacuum distillation device. When this occurs, the vacuum which can be pulled on the device is limited by the pressure head of the liquid standing in the vacuum source side of the liquid seal.

Therefore, it is an important object of the present invention to provide an improved high vacuum cold trap which is not susceptible to corrosion and therefore will not contaminate the condensate.

Another important object of the present invention is to provide an improved cold trap having no joints which are likely to stick or freeze.

Still another very important object of the present invention is to provide a cold trap of the type described which can be quickly and easily disassembled so that the condensate can be removed and all of the parts cleaned, and which can easily be reassembled to form a vacuum-tight system.

A further object of the present invention is to provide a cold trap of the type described which has no greased joints or fittings so that there is no danger of the lubricating grease contaminating the condensate.

Yet another object of the present invention is to provide a cold trap having the features and advantages set forth above which may be easily immersed within a refrigerant contained in a reasonably sized Dewar vessel.

Still another object of the present invention is to provide a cold trap of the type described which directs the vapors into a restricted cooling space and directly against a cold surface and yet which, in the event a substantial volume of liquid accumulates in such a manner that a liquid seal would otherwise be formed, may be quickly and easily adjusted, during operation, to prevent the formation of such a liquid seal.

An improved cold trap constructed in accordance with the present invention may be summarily described, without intending to limit the invention as defined by the appended claims, as comprising a generally horizontally disposed bonnet having a vertically disposed glass inlet tube extending downwardly through the center thereof, sealing means around the glass inlet tube for providing an annular seal between the inlet tube and the bonnet member, a glass condensate jar having an open top disposed around the lower end of the inlet tube with the upper open end of the jar abutting the bonnet member, second sealing means between the upper end of the jar and the bonnet member for providing a peripheral vacuum-tight seal, means connected to the bonnet for supporting the condensate jar in position, and outlet conduit means connected to the bonnet for connection to a vacuum line.

Many additional objects and advantages will be evident to those skilled in the art from the following detailed description and drawing, wherein:

The single figure is a vertical sectional view of a cold trap constructed in accordance with the present invention.

Referring now to the drawing, a cold trap constructed in accordance with the present invention is indicated generally by the reference numeral 10. The cold trap 10 is comprised of a bonnet assembly, indicated generally by the reference numeral 12, which has a tubular outlet conduit 14 and a suitable flange 16 for connection to a conventional vacuum pump or other suitable vacuum source. The flange 16 and outlet conduit 14 may therefore serve as a support bracket for the entire cold trap 10, as will hereafter become more evident as the specification progresses. The bonnet assembly 12 also includes a body portion 18 which may be considered as horizontally disposed and which has a vertically disposed, centrally located sleeve 20 which forms a vertical bore or passageway 22 extending vertically through the body potrion 18. The vertical passageway 22 is provided with a threaded counterbore 24 which receives a threaded insert or retainer ring 26. An O-ring 27 is disposed in the bottom of the counterbore 24 below the lower end of the retainer ring 26. A peripheral skirt 28 depends from the body portion 18 and has an annular, horizontally disposed seating shoulder 30 formed adjacent the lower end thereof. The annular skirt 28 continues downwardly past the annular shoulder 30 to form a downwardly extending guide portion 32. An annular passageway 34 is formed between the skirt portion 28 and interior sleeve portion 20 and is in fluid communication with the outlet conduit 14.

A relatively long, glass inlet tube 50 having a relatively large diameter extends through the threaded retainer ring 26, the O-ring 27 and the passageway 22 downwardly to a point substantially below the annular shoulder 30, substantially as illustrated. Thus when the retainer ring 26 is screwed into the threaded counterbore 24, the O-ring 27 will be compressed and will expand inwardly to engage the periphery of the glass inlet tube 50 and form both a mechanical coupling and a peripheral, vacuum-tight seal between the bonnet assembly 12 and the inlet tube 50. The inlet tube 50 may conveniently be integrally formed as a part of a conventional cold finger trap, indicated generally by the reference numeral 52, which may be provided with the socket member 54 of a conventional ground glass ball and socket joint for connecting both traps to the remainder of the distillation system, as will hereafter be described in greater detail. It should be noted that the inlet tube 50 is straight and of constant diameter for a substantial length so as to facilitate cleaning and adjustment during operation to alleviate a liquid seal when necessary, as hereafter described in greater detail.

A glass condensate receiving jar, indicated generally by the reference numeral 60, preferably is circular in shape and has a longitudinal cross section substantially as illustrated. In this connection, it will be noted that the receiving jar 60 has a lower cylindrical portion 62 and a spherically shaped bottom portion 64, both with relatively thin walls. The internal diameter of the lower cylindrical portion 62 is preferably only slightly larger than the exterior diameter of the inlet tube 50 so as to establish an annular passageway having a relatively small cross sectional area. Further, it will be noted that the inlet tube 50 extends a considerable distance into the lower cylindrical portion 62 to insure that vapors entering through the tube 50 will first contact the coldest interior surfaces of the receiving jar 60 as hereafter described.

The receiving jar 60 must be constructed strong enough mechanically to withstand atmospheric pressure and accordingly may have an upper rim portion 66 of greater thickness. The inside diameter of the upper rim portion 66 is sufficiently large as to be placed around the depending guide portion 32 of the bonnet assembly 12, and an annular V-shaped groove 68 is preferably provided in the upper edge of the upper rim portion 66, substantially as illustrated. An O-ring 70 may then be placed around the guide portion 32 between the V-shaped groove 68 and the annular shoulder 30 to provide an annular vacuum-tight seal between the receiving jar 60 and the bonnet assembly 12. A generally U-shaped wire bail 72 is connected to the bonnet assembly 12 by in-turned cleats 74 which are received in suitable aligned bores (not referenced) on opposite sides of the skirt portion 28. It will be noted that the wire bail 72 and the condensate receiving jar 60 are sufficiently small that a reasonably sized Dewar vessel 76, filled with a suitable refrigerant, such as liquid nitrogen or a mixture of crushed Dry Ice and acetone, may be placed around both the receiving jar 60 and the bail 72 with virtually the entire receiving jar 60 immersed in the refrigerant.

The cold trap 10 may conveniently be connected in the vacuum line between a distillation column and a vacuum pump in the following manner. The flange 16 may be connected to the manifold of a vacuum pump or other suitable conduit means which will serve as a support structure. The outlet conduit 14 will then serve as the support bracket for the remainder of the bonnet assembly 12 as well as the inlet tube 50 and the condensate receiving jar 60, as will be presently described. The inlet tube 50 may then be passed through the retainer ring 26, through the O-ring 27 and through the passageway 22 of the inner sleeve 20 to the desired position such as illustrated in the drawing. When the retainer ring 26 is threaded into the threaded counterbore 24, the lower end of the retainer ring 26 will compress the O-ring 27 which will expand inwardly into peripheral sealing contact with the tubular sleeve 50. The O-ring 27 in combination with the close fitting retainer ring 26 and sleeve 20 will also mechanically support the inlet tube 50, the cold finger trap 52 and the socket 54, which as previously mentioned may be fabricated as an integral glass piece. However, a length of flexible tubing should be connected in the vacuum line between the cold finger trap 52 and the distillation device so that the inlet tube 50 can be conveniently raised relative to the bonnet assembly 12 during operation in order to relieve a liquid seal as will presently be described.

The bail 72 is easily coupled to the bonnet assembly 12 merely by springing the wire outwardly and inserting the cleats 74 into the aligned bores in the skirt portion 28. The O-ring 70 may be placed in the V-shaped groove 68 in the upper rim of the condensate receiving jar 60 and, while holding the bail 72 aside, the receiving jar 60 can be moved upwardly around the depending inlet tube 50 and around the guide portion 32 until the O-ring 70 contacts the annular seating shoulder 30. Then the bail 72 may be pivoted under the lower end 64 of the receiving jar 60 to hold the jar in position until such time as a vacuum is established within the system. Once the vacuum is established, atmospheric pressure will seat the upper rim of the receiving jar 60 firmly against the O-ring 70 to form a peripheral, vacuum-tight seal between the jar and the bonnet assembly 12. Of course, the socket 54 may be mated with a ball member to form a complete vacuum-tight joint in a conduit extending to the vacuum distillation column or device. The Dewar vessel 76, filled with a suitable refrigerant, may then easily be raised upwardly around the receiving jar 60 and the bail 72 until virtually the entire receiving jar 60 is immersed in the liquid refrigerant, and supported in any suitable manner.

As the vacuum pump increases the vacuum pressure within the system, the atmospheric pressure acting on the refrigerant in the Dewar vessel 76 will force the liquid refrigerant against the bottom of the jar 60 and press the jar firmly against the O-ring 70. Atmospheric pressure seeping by the retainer ring 26 will also tend to further compress the O-ring 27 and thereby tend to increase the tightness of the annular seal formed between the inlet tube 50 and the bonnet assembly 12 such that a vacuum-tight seal will be perfected without mechanical assistance from the retainer ring. Therefore, the retainer ring can thereafter be loosened to permit the inlet tube 50 to be raised within the receiving jar 60 to prevent the formation of a liquid seal.

During the initial stages of the distillation run, the great volume of vapors tending to pass through the vacuum line and be expelled from the vacuum pump will be condensed in the cold finger trap 52 and may be drained therefrom in the conventional manner by a tap (not illustrated). However, after a high vacuum is established, most vapors will not be condensable because of the greatly increased vapor velocities in the cold finger trap 52 and the outlet therefrom will be sealed. Vapors passing through the cold finger trap 52 will then pass downwardly through the inlet tube 50 and will continue on due to momentum to contact the spherical surface of the bottom 64 of the receiving jar 60, which will be at a very cold temperature due to the refrigerant in the Dewar vessel 76. The condensable vapors will be immediately condensed on the glass interior surface of the receiving jar 60. Any uncondensed gases will continue upwardly through the annular passageway formed between the lower cylindrical portion 62 and the inlet tube 50 and will pass out through the outlet conduit 14 to the exhaust pump.

The condensed vapors will be maintained in the liquid phase by the refrigerant in the Dewar vessel 76. As the condensate accumulates, it may rise to a level above the lower end of the glass inlet tube 50, in which case a liquid seal would be formed between the vacuum source and the distillation column. The pressure within the distillation column would then be increased an amount equal to the height the liquid rose above the lower end of the inlet tube 50. However, due to the fact that the inlet tube 50 is of substantially constant diameter and generally straight, the O-ring 27 will hold a high vacuum even when the retainer ring 26 is loosened after the vacuum is established, the ring 26 can be loosened and the inlet tube 50 raised relative to the receiving jar 60 until it is above the level of the condensate standing in the jar. This relative movement is permitted by the flexible conduit connected in the vacuum line on either side of the cold trap 10. After the inlet tube 50 has been raised in this manner the vapors will still be directed against the surface of the condensate jar which will be maintained substantially at the temperature of the refrigerant.

When the distillation run is completed and it is desired to remove the condensate from the receiving jar 60, the pressure within the system, and therefore within the jar 60 is raised to atmospheric pressure by the most convenient means. After the Dewar vessel 76 is removed, the bail 72 can be pivoted to one side and the condensate receiving jar 60 easily lowered from the bonnet assembly 12. It will also be noted that it is unnecessary to further disassemble the cold trap 10 or the vacuum line extending to either the distillation column or to the vacuum pump in order to clean the cold trap preparatory to the next distillation run. The interior of the straight, relatively large diameter inlet tube 50 may easily be swabbed by a brush or other suitable means, and the exterior cleaned by a cloth or flushed by a suitable liquid. Although it is virtually impossible for the interior of the bonnet assembly 12 to become contaminated or corroded, because no condensable vapors can pass the cold glass walls of the receiving jar 60, if necessary, it will be evident that the underside of the bonnet assembly 12 and interior of the annular passageway 34 of the assembly may easily be flushed and cleaned by a suitable solvent without disconnecting the bonnet assembly from the manifold of the vacuum pump or other structure to which it is connected by the flange 16.

From the above detailed description of one preferred embodiment of the present invention, it will be evident to those skilled in the art that a novel cold trap having great utility has been disclosed. However, it is to be understood that various changes, substitutions and alterations can be made therein without departing from the spirit and scope of the present invention as defined by the appended claims.

What is claimed is:

1. A cold trap assembly for a vacuum line extending between a high vacuum distillation device and a vacuum source, the assembly comprising:

a horizontally disposed bonnet member having a vertical passageway extending therethrough and a downwardly facing annular seating face disposed around the passageway;

a glass inlet tube for connection to the vacuum line extending to the vacuum column, the inlet tube extending downwardly through the passageway to a point substantially below the bonnet member;

sealing means for providing a vacuum-tight seal between the glass inlet tube and the bonnet;

a glass condensate receiving jar disposed around the lower end of the glass inlet tube and having an upper rim sized to mate with the annular seating face;

annular sealing means for providing a vacuum-tight seal between the upper rim of the receiving jar and the annular seating face; and, vapor outlet means in the bonnet member for connection to the vacuum line extending to the vacuum pump, whereby vapors from the vacuum column will pass in through the glass inlet tube and flow downwardly into contact with the glass receiving jar which may be cooled such that the condensable vapors will be condensed and collect in the jar, and the uncondensable vapors will then pass upwardly through the annulus between the jar and the inlet tube and out through the vapor outlet means to the vacuum pump.

2. A cold trap assembly for a vacuum line extending between a high vacuum distillation device and a vacuum source, the assembly comprising:

a bonnet member having a generally horizontally disposed body portion, a depending skirt portion around the periphery of the body portion, an annular seating face formed around the lower end of the skirt portion, a centrally located sleeve portion connected to the body portion and extending downwardly within the skirt portion, and forming a vertical passageway extending through the bonnet member, and an annular passageway between the skirt portion and the sleeve portion, a threaded counterbore in the upper end of the vertical passageway, an O-ring seal in the bottom of the counterbore, and a retainer ring threaded into the counterbore for compressing the O-ring seal, the retainer ring having a bore extending therethrough of substantially the same diameter as the passageway formed through the centrally located sleeve;

a glass inlet tube for connection to the vacuum line extending to the vacuum column, the glass inlet tube extending downwardly through the retainer ring, the O-ring seal and the centrally located sleeve to a point substantially below the annular seating face on the skirt portion such that when the retainer ring is tightened into the counterbore the O-ring seal is compressed into peripheral sealing engagement with the inlet tube;

a cylindrical glass condensate receiving jar having an upper rim sized to mate with the annular seating face, the receiving jar being disposed around the lower end of the glass inlet tube with the upper rim in mating relationship with the annular seating face;

a second O-ring seal disposed between the upper rim and the annular seating face;

means connected to the bonnet member for holding the receiving jar in position until a vacuum can be created at which time atmospheric pressure will force the receiving jar upwardly against the second O-ring seal and the bonnet member to form a vacuum-tight seal; and, tubular conduit means connected to the skirt portion and in fluid communication with the annular passageway for connection to a support structure for supporting the assembly and for connection to the vacuum line extending to the vacuum pump.

3. A cold trap assembly for a vacuum line extending between a high vacuum distillation device and a vacuum source, the assembly comprising:

a bonnet member having a top and a bottom and having an opening therethrough extending substantially perpendicular to the top and bottom;

an inlet tube for connection to the vacuum distillation column extending downwardly through the opening to a point substantially beyond the bottom of the bonnet member;

first sealing means operatively disposed between the bonnet member and the outer wall of the inlet tube for establishing a seal therebetween, said first sealing means comprising a threaded counterbore in the opening through the bonnet member to form an annular shoulder, an annular resilient seal disposed around the inlet tube in the counterbore and adjacent the shoulder, and a threaded tubular sleeve disposed around the inlet tube and threaded into the counterbore for compressing the resilient seal into contact with the shoulder and the inlet tube;

a condensate receiving jar disposed around the extended end of the inlet tube;

second sealing means for sealing the mouth of the jar to the bottom of the bonnet member;

means for retaining the jar against the second sealing means whenever the pressure within the jar is not appreciably less than the pressure outside the jar; and, vapor outlet means in the bonnet member and in fluid communication with the interior of the jar for connection to the vacuum pump.

4. A cold trap assembly for a vacuum line extending between a high vacuum distillation device and a vacuum source as defined in claim 3 wherein:

the second sealing means comprises an annular resilient sealing ring disposed between the rim of the jar and the bottom of the bonnet member.

5. A cold trap assembly for a vacuum line extending between a high vacuum distillation device and a vacuum source as defined in claim 3 wherein:

the means for retaining the jar against the second sealing means comprises a U-shaped bail pivotally connected to the bonnet member at the ends thereof, the bail extending under the jar for supporting the jar.

References Cited by the Examiner
UNITED STATES PATENTS

| | | | |
|---|---|---|---|
| 1,845,247 | 2/32 | Davidson | 62—42 X |
| 2,163,996 | 6/39 | Flosdorf | 34—5 X |
| 2,317,814 | 4/43 | Schuchmann | 62—42 |
| 2,512,040 | 6/50 | Slobod | 62—42 X |
| 3,009,258 | 11/61 | Taylor | 34—5 X |
| 3,021,683 | 2/62 | McInroy | 62—42 |

NORMAN YUDKOFF, *Primary Examiner.*